United States Patent
Kasai et al.

(10) Patent No.: US 9,138,992 B2
(45) Date of Patent: Sep. 22, 2015

(54) RECEPTION DEVICE AND APPARATUS HAVING THE SAME

(71) Applicant: CANON KABUSHIKI KAISHA, Tokyo (JP)

(72) Inventors: Ryo Kasai, Tokyo (JP); Nobuyuki Hirayama, Fujisawa (JP); Tatsuo Furukawa, Zama (JP); Kimiyuki Hayasaki, Kawasaki (JP); Hisao Terajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 14/048,541

(22) Filed: Oct. 8, 2013

(65) Prior Publication Data
US 2014/0035977 A1 Feb. 6, 2014

Related U.S. Application Data

(63) Continuation of application No. 12/964,667, filed on Dec. 9, 2010, now Pat. No. 8,579,399.

(30) Foreign Application Priority Data

May 10, 2010 (JP) ................. 2010-108790

(51) Int. Cl.
*B41J 29/38* (2006.01)
*B41J 2/07* (2006.01)
*H04L 25/49* (2006.01)
*H04L 25/02* (2006.01)

(52) U.S. Cl.
CPC ............... *B41J 2/07* (2013.01); *H04L 25/0292* (2013.01); *H04L 25/49* (2013.01); *G06F 2213/0038* (2013.01); *H04L 25/0272* (2013.01)

(58) Field of Classification Search
USPC .................. 347/5, 9, 10, 17, 12, 14
See application file for complete search history.

(56) References Cited

U.S. PATENT DOCUMENTS 7,441,859 B2 * 10/2008 Hayasaki ................ 347/17
2006/0221105 A1 * 10/2006 Imanaka et al. ............ 347/10

* cited by examiner

*Primary Examiner* — Lam Nguyen
(74) *Attorney, Agent, or Firm* — Canon USA, Inc. IP Division (57) ABSTRACT

Data transfer is realized to support a high-speed and complex driving control of the driving element. A driving device includes a driving unit configured to supply a driving element with a pulse signal that determines a driving period to drive the driving element, an input unit configured to receive, in synchronization with a trigger signal, a data signal containing first information, second information, a first flag and a second flag that determine a waveform of the pulse signal, a first setting unit configured to set in the driving unit the first information that is input to the input unit, a retaining unit configured to read and retain the second information on the basis of the first flag, and a second setting unit configured to set in the driving unit the second information that is retained in the retaining unit on the basis of the second flag.

5 Claims, 12 Drawing Sheets

RECEPTION DEVICE AND APPARATUS HAVING THE SAME

CROSS-REFERENCE TO RELATED APPLICATION

This application is a Continuation of U.S. application Ser. No. 12/964,667, filed Dec. 9, 2010, which claims priority from Japanese Patent Application No. 2010-108790 filed May 10, 2010, which are hereby incorporated by reference herein in their entireties.

BACKGROUND OF THE INVENTION

1. Field of the Invention

The present invention relates to transfer control of serial data, and to data transfer between apparatuses.

2. Description of the Related Art

Communication between devices employs serial transfer because the serial transfer allows a multi-bit data signal to be transferred by using a small number of signal lines and terminals which are interfaces between the devices. Japanese Patent Laid-Open No. 7-256883 discloses serial transfer in the communication between a recording device and a recording head. In this serial transfer, information that determines a driving period for the recording head and recording data are transferred.

However, in order to support a high-speed and complex driving control of the recording head, an increase in the amount of information used for controlling the recording head and an increase in the transfer speed are required. Meanwhile, reduction in size and cost of devices such as recording devices is also required.

SUMMARY OF THE INVENTION

A driving device includes a driving unit configured to supply a driving element with a pulse signal that determines a driving period to drive the driving element, an input unit configured to receive, in synchronization with a trigger signal, a data signal containing first information, second information, a first flag and a second flag that determine a waveform of the pulse signal, a first setting unit configured to set in the driving unit the first information that is input to the input unit, a retaining unit configured to read and retain the second information on the basis of the first flag, and a second setting unit configured to set in the driving unit the second information that is retained in the retaining unit on the basis of the second flag.

Further features of the present invention will become apparent from the following description of exemplary embodiments with reference to the attached drawings.

DESCRIPTION OF THE EMBODIMENTS

First Embodiment

Figure 1A:
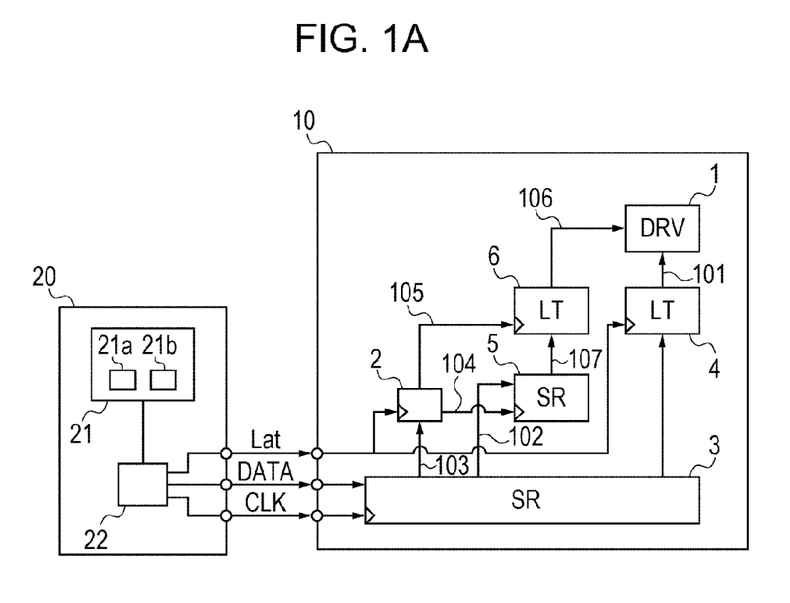
FIGS. 1A and 1B are diagrams illustrating a circuit configuration of an apparatus.
Figure 1B:
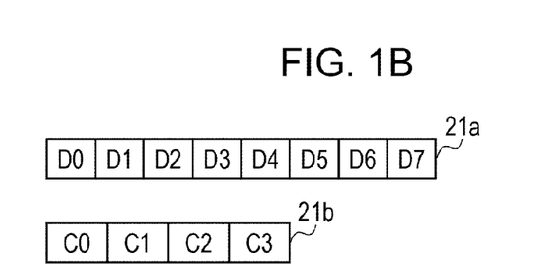

FIGS. 1A and 1B are diagrams illustrating a circuit configuration of an apparatus that performs data transfer in a serial format. An apparatus 10 serially receives a data signal (DATA) by using a clock signal (CLK) and a trigger signal (Lat). The clock signal (CLK), the trigger signal (Lat) and the data signal (DATA) are input to the apparatus 10 by using a first signal line, a second signal line and a third signal line, respectively.

The apparatus 10 includes a reception circuit that receives signals from the outside and a driving circuit (DRV) 1 that drives a driving element by using received data. The reception circuit includes a control circuit 2, a shift register 3, a latch circuit (LT) 4, a shift register 5 and a latch circuit 6. The shift register 3 (first shift register) receives the data signal (DATA) on the basis of the clock signal (CLK). The data signal (DATA) is composed of information of 10 bits B0 to B9. The latch circuit 4 (first latch circuit) latches, on the basis of the trigger signal (Lat), data of eight bits B0 to B7 input from the shift register 3 by using a signal line 101. The data latched by the latch circuit (LT) 4 is output to the driving circuit (DRV) 1. The shift register 5 (second shift register) receives data of bit B8 input from the shift register 3 on the basis of a pulse signal output from the control circuit 2. The shift register 5 retains (holds) data for four bits. The latch circuit 6 (second latch circuit) latches data of four bits input from the shift register 5. The data latched by the latch circuit 6 is output to the driving circuit (DRV) 1. The control circuit 2 (reception control circuit) controls operation of the shift register 5 and the latch circuit 6. The control circuit 2 receives data of bit B9 input from the shift register 3 upon the input of the trigger signal (Lat).

An apparatus 20 includes a control circuit 21 and a transmission control circuit 22. The control circuit 21 includes a register 21a that retains (holds) first information consisting of multiple bits (eight bits, for example) and a register 21b that retains second information consisting of four bits, as shown in FIG. 1B. The control circuit 21 transmits the information retained in the register 21a and the register 21b to the transmission control circuit 22. The transmission control circuit 22 transfers the data to the apparatus 10 in a manner shown in FIG. 2. In other words, the configuration of FIG. 1A is a system having a transmission device (transmission apparatus) 20 and a reception device (reception apparatus) 10.

In this embodiment, it may be sufficient to set the second information for the driving circuit of the apparatus 10 once every four times the setting of the first information is made. Therefore, the apparatus 20 transfers part of the second information when transferring the first information. Thus, the control is carried out in such a manner that the second information is transferred in several batches, and this allows the apparatus 20 to reduce the number of bits to be transferred in each serial transfer.

Figure 2:
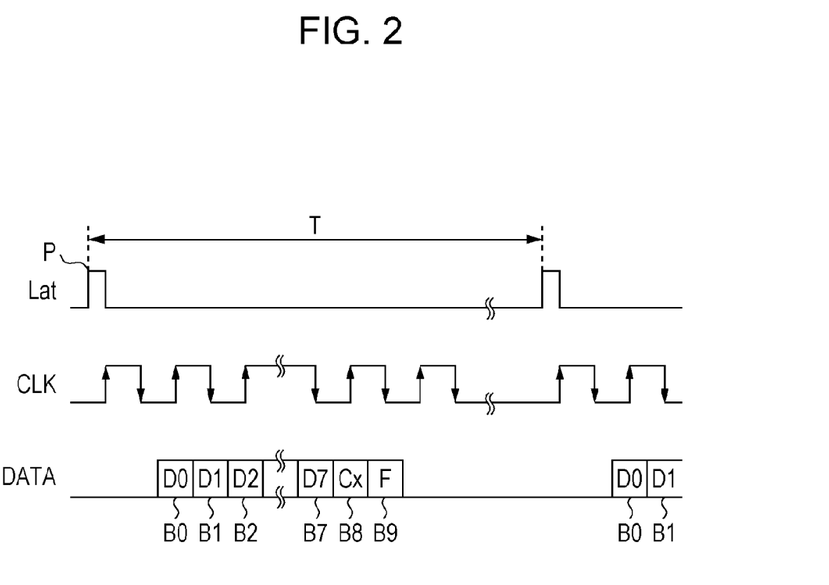
FIG. 2 is a diagram illustrating data transfer.

FIG. 2 is a diagram illustrating timings of the data signal (DATA), the clock signal (CLK) and the trigger signal (Lat). In the data signal (DATA), information of 10 bits B0 to B9 is transferred. The shift register 3 detects and receives a rising edge and a falling edge of the clock signal (CLK). A pulse P of the trigger signal (Lat) is transferred in a period T. The data signal (DATA) is composed of eight bits of the first information B0 (D0) to B7 (D7), one bit of the second information B8 (Cx where x is 0, 1, 2 or 3), and one bit of third information B9 (F). The first information and the second information are set for the driving circuit of the apparatus 10. The third information is control information to be used in the control of the reception circuit. B9 (F) is a flag. The flag value "1" indicates that the flag is set, and the flag value "0" indicates that the flag is reset.

Figure 3:
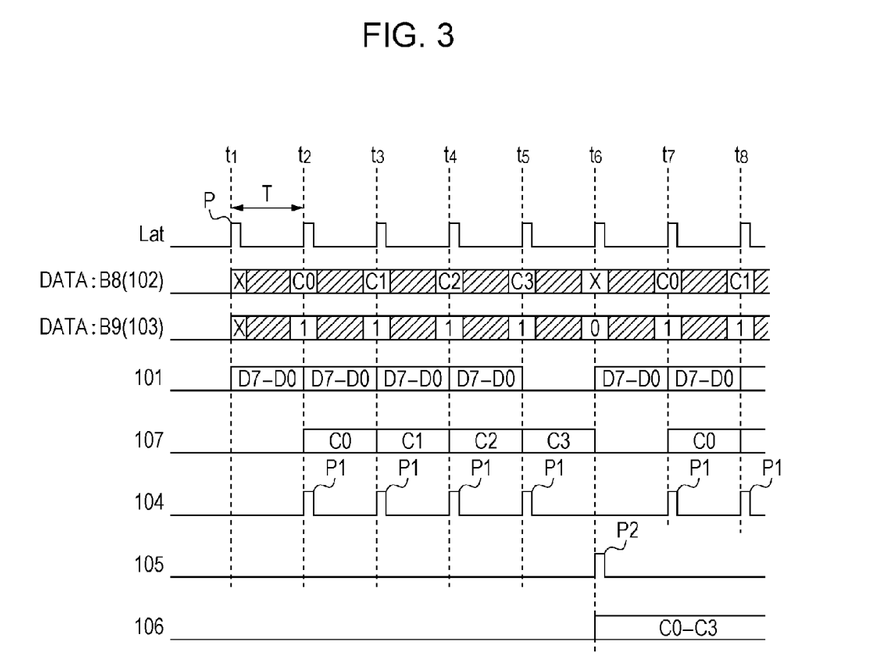
FIG. 3 is a diagram illustrating processing of input data.

Data transfer in the apparatus 10 will be explained with reference to FIGS. 1A, 1B and 3. Suppose the data signal (DATA) has been input to the shift register 3 before timing $t_1$. When a pulse signal P of the timing $t_1$ is input, B0 (D0) to B7 (D7) of the data signal (DATA) are latched by the latch circuit 4, and then output to the driving circuit (DRV) 1.

When B9 of the data signal (DATA), which has been input to the shift register 3, is "1" (that is, when the flag is set), the control circuit 2 retains the logic level of a signal line 104 at a high level for a predetermined period upon the detection of a rising edge of the trigger signal (Lat). Then, the control circuit 2 sets the logic level of the signal line 104 to a low level. When the control circuit 2 performs these operations, a pulse signal P1 (first pulse signal) is transferred to the shift register 5. The shift register 5 receives data in the shift register 3 upon the detection of a rising edge of the pulse signal P1. Meanwhile, when B9 of the data signal (DATA), which has been input to the shift register 3, is "0" (that is, when the flag is reset), the control circuit 2 retains the logic level of a signal line 105 at a high level for a predetermined period upon the detection of a rising edge of the trigger signal (Lat). Then, the control circuit 2 sets the logic level of the signal line 105 to a low level. When the control circuit 2 performs these operations, a pulse signal P2 is transferred to the latch circuit 6.

Therefore, when the pulse P of the timing $t_1$ is input, the control circuit 2 receives B9 having "1" and outputs the pulse P1 at timing $t_2$. The shift register 5 receives "C0" from the shift register 3 via a signal line 102 in response to the pulse P1 of the timing $t_2$. The latch circuit 6 receives "C0" from the shift register 5 via a signal line 107 in response to the pulse P1 of the timing $t_2$. Next, when the pulse P of the timing $t_2$ is input, the control circuit 2 receives B9 having "1" and outputs the pulse P1 at timing $t_3$. The shift register 5 receives "C1" from the shift register 3 via the signal line 102 in response to the pulse P1 of the timing $t_3$. The latch circuit 6 receives "C1" from the shift register 5 via the signal line 107 in response to the pulse P1 of the timing $t_3$. The control circuit 2 afterward repeats the same operation until B9 having "0" is received, and "C2" and "C3" are transferred to the shift register 5 in sequence. Then, when the pulse P of timing $t_5$ is input, the control circuit 2 receives B9 having "0", and outputs the pulse P2 at timing $t_6$. When the pulse signal P2 (second pulse signal) is transferred to the latch circuit 6, four-bit data is latched in the latch circuit 6 and output to the driving circuit (DRV) 1.

As described above, data which has been input four separate times in a unit of nine bits (D0 to D7, Cx) from the apparatus 20 can be processed in a period from the timing $t_1$ to $t_7$. The shaded portions of B8 and B9 indicate the data transition period. "X" of B8 and B9 is a value that is not related to control.

When the above circuit configuration is expressed differently, an input unit such as the shift register 3 receives serial data, and a setting unit such as the latch circuit 4 sets part of information (D0 to D7) in the driving circuit 1. Meanwhile, when the value of the flag (B9 in FIG. 2) is "1", a data retaining unit such as the shift register 5 retains information (Cx where x=0 to 3). When the value of the flag is "0", a setting unit such as the latch circuit 6 performs setting in the driving circuit (DRV) 1.

Second Embodiment

Figure 4:
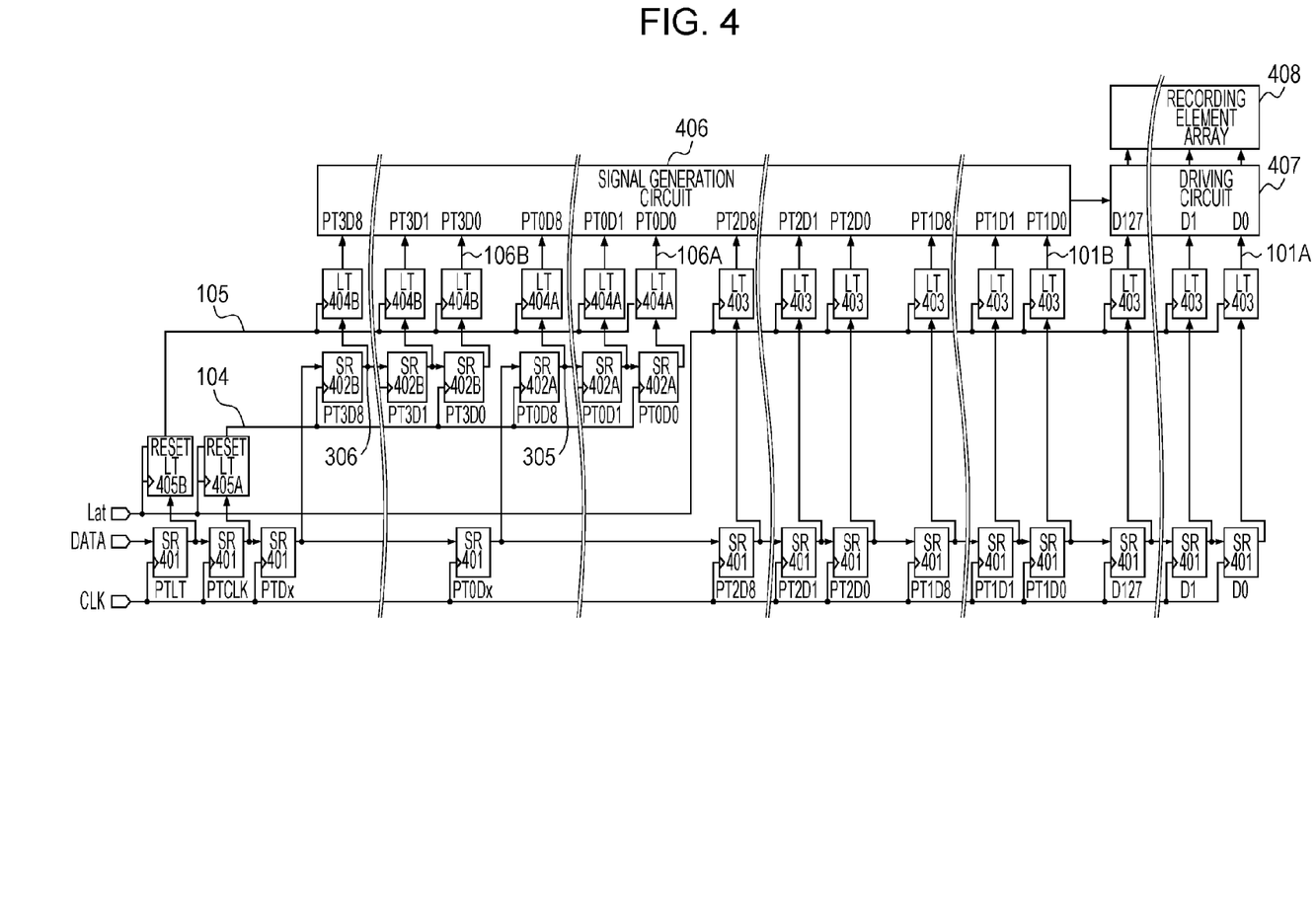
FIG. 4 is a diagram illustrating a circuit configuration of an apparatus.

FIG. 4 is a diagram illustrating the apparatus 10 in a second embodiment. In the second embodiment, the apparatus 10 is a recording head and the apparatus 20 is a recording device. In FIG. 4A, a shift register (SR) 401 corresponds to the shift register (SR) 3 of FIG. 1. A latch circuit (LT) 403 corresponds to the latch circuit (LT) 4 of FIG. 1. A shift register (SR) 402A and a shift register (SR) 402B correspond to the shift register (SR) 5 of FIG. 1. A latch circuit (LT) 405A and a latch circuit (LT) 405B correspond to the control circuit 2 of FIG. 1. A signal generation circuit 406 and a driving circuit 407 correspond to the driving circuit (DRV) 1 of FIG. 1.

The shift register 401 receives a data signal (DATA) at timings of both edges of a clock signal (CLK). The latch circuit 403 retains data output from the shift register 401 upon the input of a trigger signal (Lat). The latch circuit 403 outputs, to the driving circuit 407, 128 bits (D0 to D127) of data among the data input from the shift register 401, and outputs, to the signal generation circuit 406, 18 bits (PT1D0 to PT1D8 and PT2D0 to PT2D8) of data among the data input from the shift register 401. The latch circuit 405A generates a signal 104S on the basis of the value of PTCLK retained in the shift register 401. The latch circuit 405B generates a signal 105S on the basis of the value of PTLT retained in the shift register 401. The shift register 402A receives PT0Dx retained in the shift register 401 on the basis of the signal 104S. The shift register 402B receives PT3Dx retained in the shift register 401 on the basis of the signal 104S. A latch circuit 404A latches data of shift register 402A on the basis of the input (rising) of the signal 105S. Also, a latch circuit 404B latches data of shift register 402B on the basis of the input (rising) of the signal 105S. The latch circuit 404A and the latch circuit 404B output latched data to the signal generation circuit 406.

Figure 5:
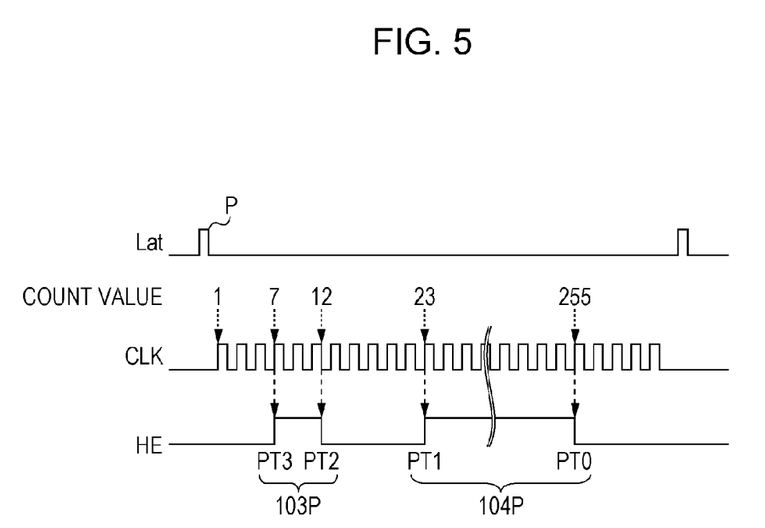
FIG. 5 is a diagram illustrating a signal that drives a recording element.

FIG. 5 is a diagram illustrating an HE signal that the signal generation circuit 406 generates. The value of each of PT0 (PT0D0 to PT0D8), PT1 (PT1D0 to PT1D8), PT2 (PT2D0 to PT2D8), and PT3 (PT3D0 to PT3D8) is information of the clock signal (CLK). PT0, PT1, PT2, and PT3 are parameters to determine pulse width of the HE signal or timing of the HE signal. In this case, the information is the number of edges in the clock signal (CLK). For example, the value expressed by PT3D0 to PT3D8 is seven and the value expressed by PT2D0 to PT2D8 is 12. With the information, a prepulse 103P is generated from the 7th edge timing to the 12th edge timing. Similarly, the value of PT1D0 to PT1D8 is 23 and the value of PT0D0 to PT0D8 is 255. With the information, a main pulse 104P is generated from the 23rd edge timing to the 255th edge timing. Driving the recording element on the basis of such HE signals causes ink to be ejected.

Figure 6:
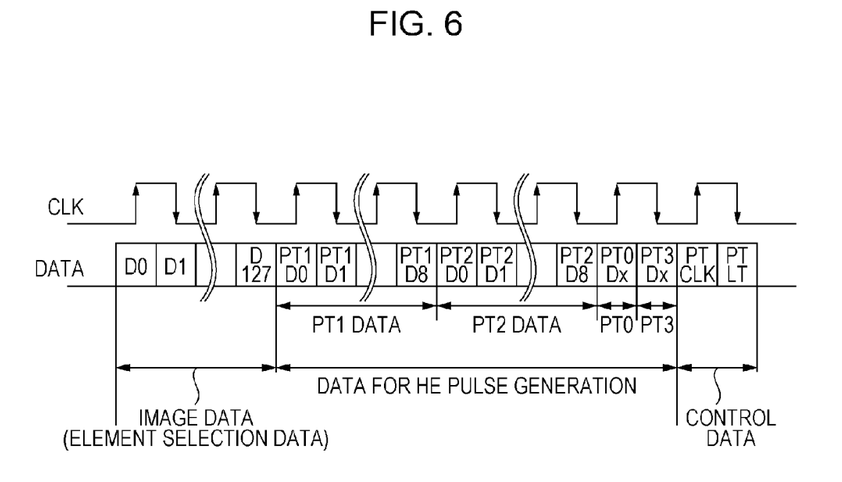
FIG. 6 is a diagram illustrating data transfer.

FIG. 6 is a diagram illustrating information contained in the data signal (DATA). The data signal (DATA) contains a total of 150 bits of data including 128 bits of image data, 20 bits of data composed of PT0Dx, PT1D0 to PT1D8, PT2D0 to PT2D8 and PT3Dx, and two bits of data composed of PTCLK and PTLT.

Figure 7:
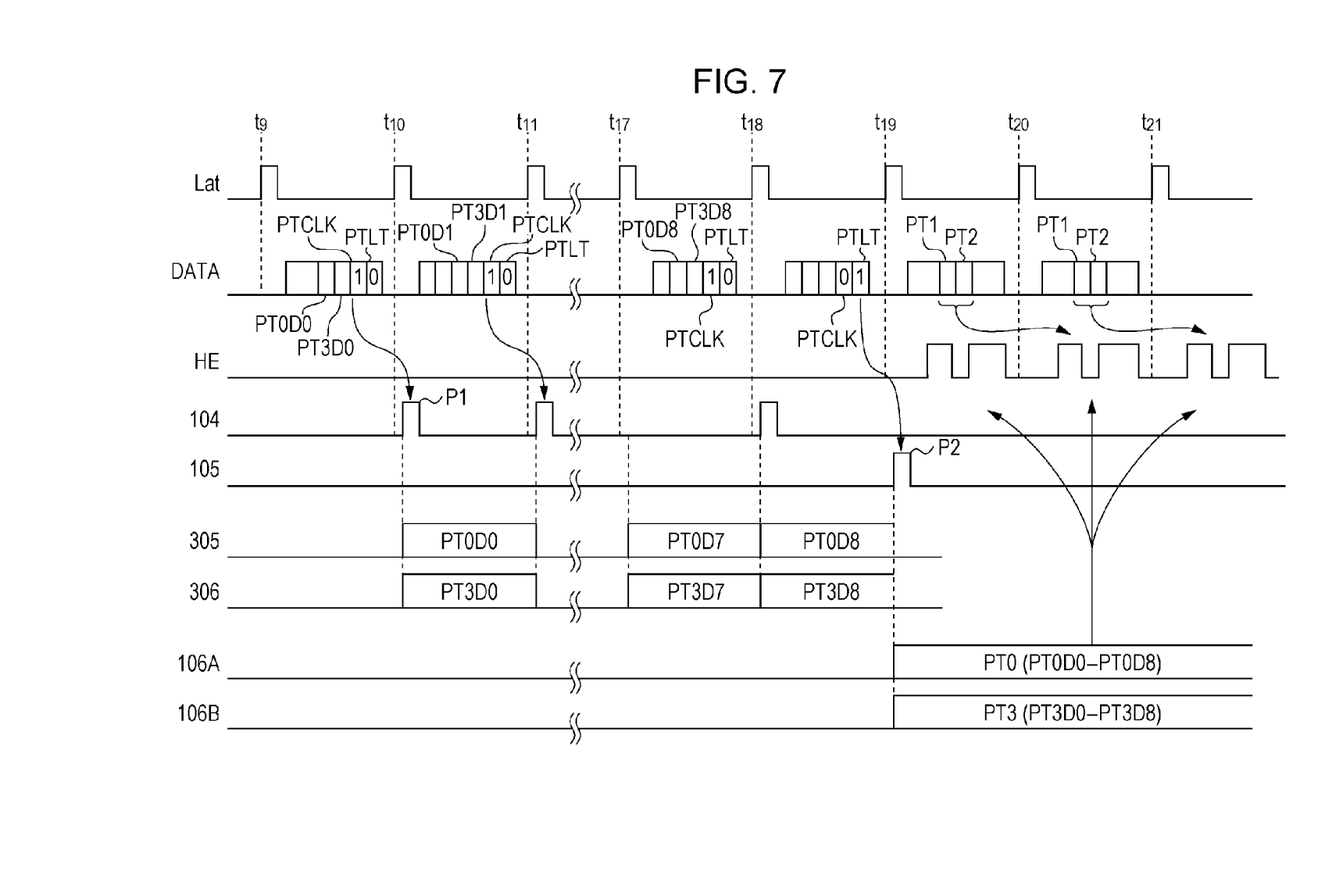
FIG. 7 is a diagram illustrating processing of input data.

FIG. 7 is a diagram illustrating the processing inside the recording head. The data transfer process is the same as that of the first embodiment. For simplicity, the explanations for the clock signal (CLK) and image data contained in the data signal (DATA) are omitted. First, processing of PT0D0 to PT0D8 and PT3D0 to PT3D8 will be explained. As described in the first embodiment, data of PT0D0 to PT0D8 and data of PT3D0 to PT3D8 are received on a bit-by-bit basis. When the value of PTCLK contained in the data signal (DATA) is "1", the latch circuit 405A outputs a pulse signal P1 to the signal line 104 on the basis of the trigger signal (Lat) that has been input at timing $t_{10}$. The shift register 402A receives PT0D0 (signal 305) on the basis of the pulse signal P1. Similarly, the shift register 402B receives PT3D0 (signal 306). Next, since the value of PTCLK contained in the data signal (DATA) received during a period from timing $t_{10}$ to timing $t_{11}$ is "1", similarly on the basis of the pulse signal P1, the shift register 402A receives PT0D1 and the shift register 402B receives PT3D1. Finally, the shift register 402A receives PT0D8 and the shift register 402B receives PT3D8 during a period from timing $t_{18}$ to timing $t_{19}$.

Then, since the value of PTLT contained in the data received during a period from the timing $t_{18}$ to the timing $t_{19}$ is "1", which is a first value, the latch circuit 405B outputs a pulse signal P2 to the signal line 105. If the value of PTLT is "0", which is a second value, the latch circuit 405B does not output a pulse signal P2 to the signal line 105. On the basis of the pulse signal P2, the latch circuit 404A outputs PT0D0 to PT0D8 to the signal generation circuit 406 via a signal line 106A. The latch circuit 404B outputs PT3D0 to PT3D8 to the signal generation circuit 406 via a signal line 106B. With these operations, timing of PT0 and timing of PT3 of the HE signal after $t_{19}$ are set. The timing for the next setting occurs when a signal in which the value of PTLT is "1" is received.

Next, processing of PT1 (PT1D0 to PT1D8) and PT2 (PT2D0 to PT2D8) will be explained. For convenience of illustration, explanation of an example of a data signal (DATA) received during a period $t_{19}$ to $t_{20}$ will be given. Data of PT1 and PT2 contained in the data signal (DATA) is output to the signal generation circuit 406 via a signal line 101B by the latch circuit 403 when a trigger signal (Lat) of the timing $t_{20}$ is input. As described above, whenever a trigger signal (Lat) is input, setting of the signal generation circuit 406 is performed.

When the above circuit configuration is expressed differently, an input unit such as the shift register 401 receives serial data, and a setting unit such as the latch circuit 403 sets part of information (D0 to D127) in the driving circuit 407. Meanwhile, when the value of the flag (PTCLK in FIG. 6) is "1", data retaining units such as the shift registers 402A and 402B retain information (PT0Dx and PT3Dx where x=0 to 3). When the value of the flag (PTLT in FIG. 6) is "1", setting units such as the latch circuits 404A and 404B perform setting in the signal generation circuit 406.

Third Embodiment

Figure 8:
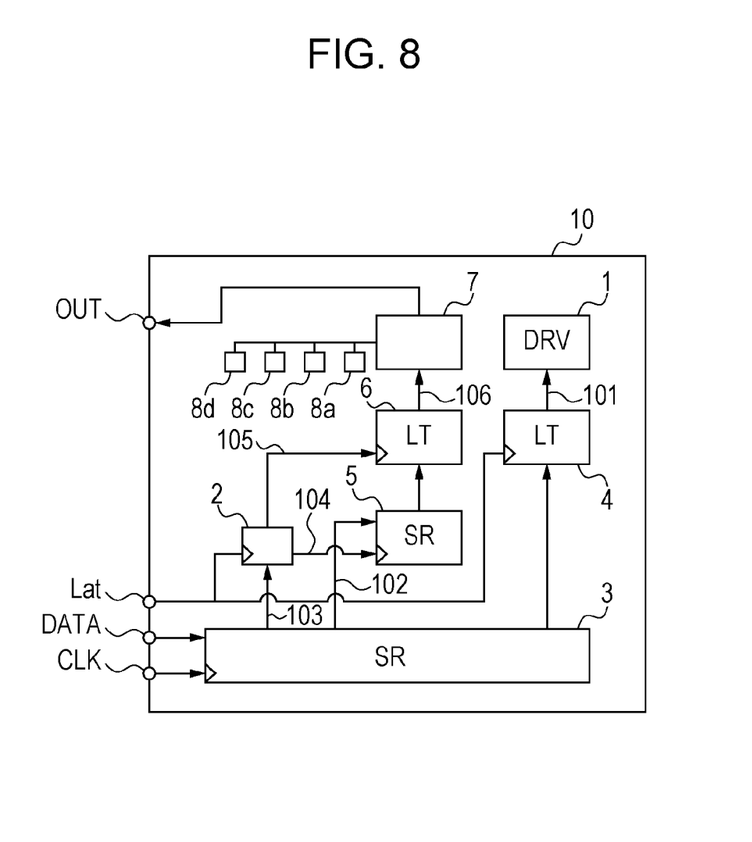
FIG. 8 is a diagram illustrating a circuit configuration of an apparatus.

FIG. 8 is a diagram illustrating the apparatus 10 (recording head) in a third embodiment. The recording head 10 includes, for example, four sensors 8a, 8b, 8c and 8d. These sensors are temperature sensors. A sensor control circuit 7 selects a sensor from which information is obtained on the basis of the value contained in a data signal, and outputs the information about the sensor.

The apparatus 20 transfers four bits (C0, C1, C2 and C3) of data on a bit-by-bit basis in order to select any one of the sensors. This data processing method is the same as that shown in FIG. 3.

Figure 9:
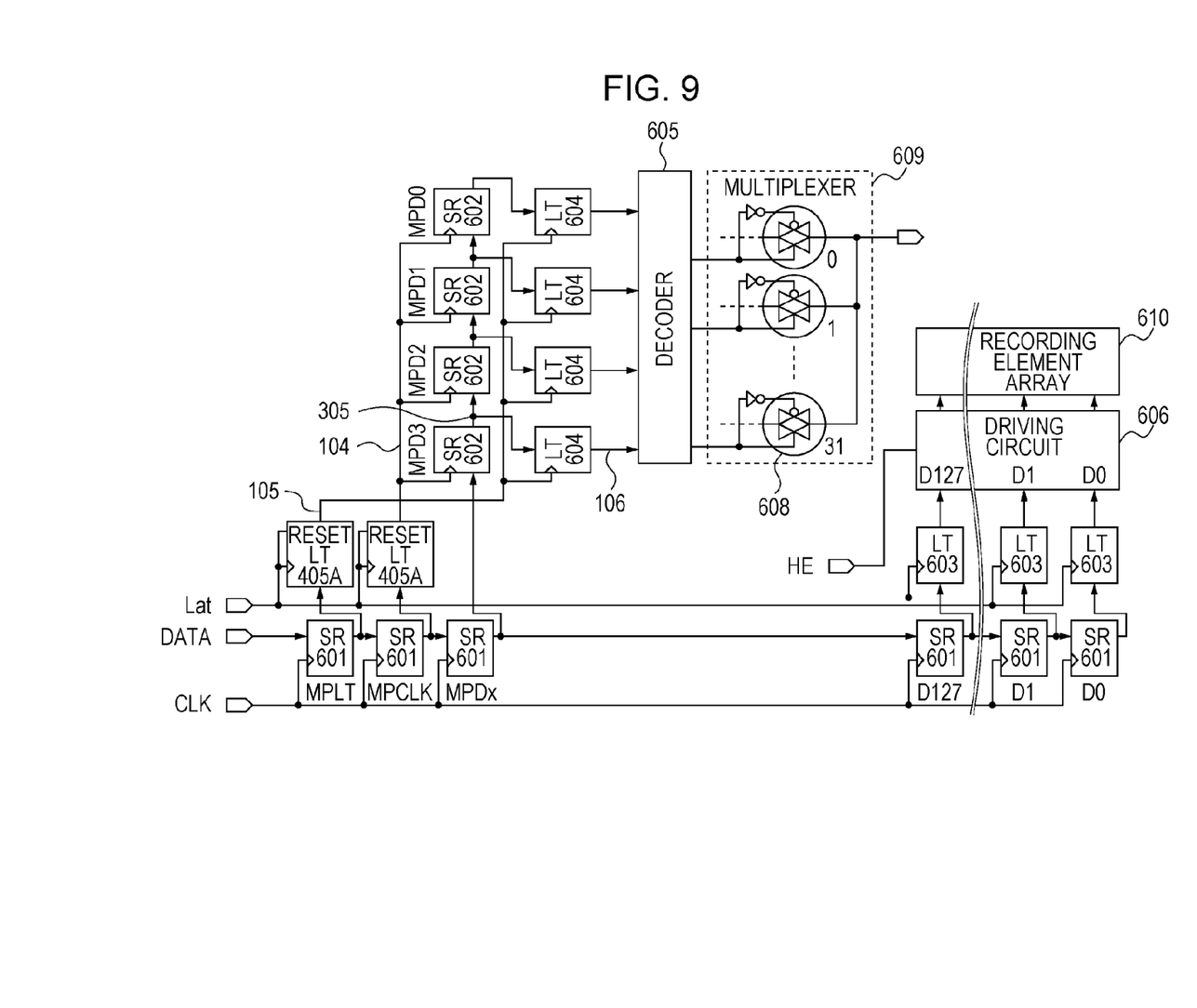
FIG. 9 is a diagram illustrating a circuit configuration of an apparatus.

FIG. 9 is an example of the circuit configuration of FIG. 8. The sensor control circuit 7 includes a decoder circuit 605 and a multiplexer 609. The multiplexer 609 is composed of 32 analog switches 608, and thus up to 32 sensors can be selected. An analog signal such as substrate temperature or voltage output from each sensor is output to a control unit of the recording device via the multiplexer 609. The decoder circuit 605 receives a signal from a latch circuit (LT) 604 to control the multiplexer 609.

Figure 10:
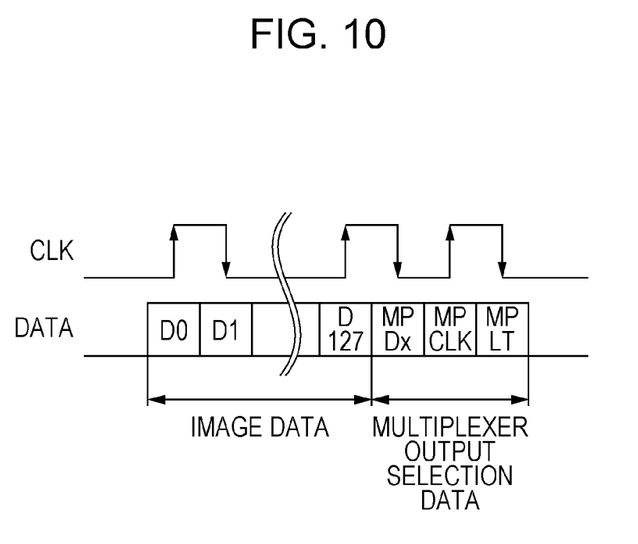
FIG. 10 is a diagram illustrating data transfer.
Figure 11:
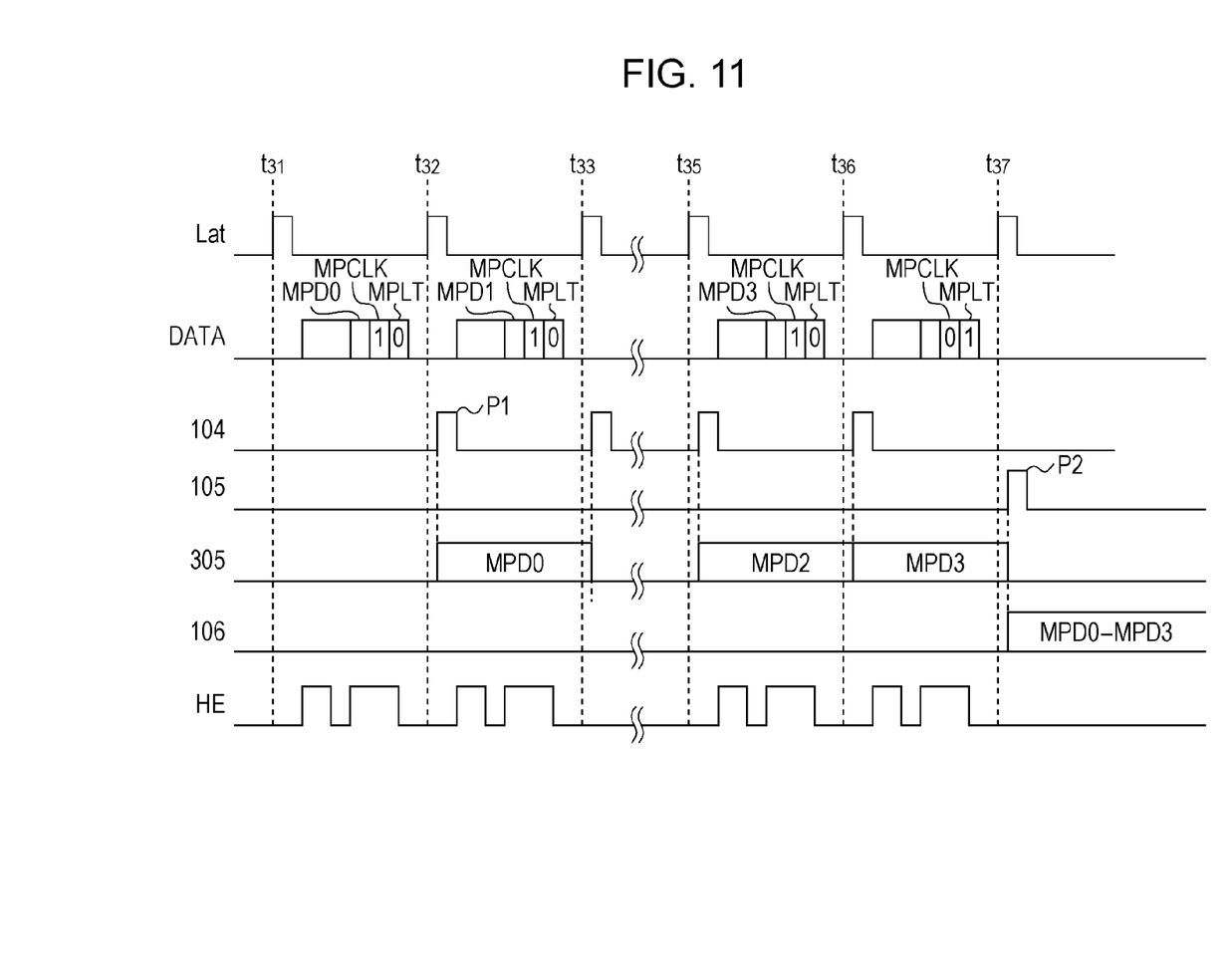
FIG. 11 is a diagram illustrating processing of input data.

FIG. 10 is a diagram illustrating data transfer. Three bits of multiplexer output selection data are transferred along with 128 bits of image data. FIG. 11 is a diagram illustrating the data transfer of FIG. 10 and the processing thereof.

In FIG. 11, since MPCLK contained in data received during a period from timing $t_{31}$ to timing $t_{32}$ is "1", a pulse signal P1 is input as a clock signal to a shift register 602. Consequently, MPD0 is transferred during a period from timing $t_{32}$ to timing $t_{33}$ and input to the shift register 602 shown in FIG. 9. Afterward MPD1, MPD2 and MPD3 are input in sequence to the shift register 602. Then, during a period from timing $t_{36}$ to timing $t_{37}$, data in which MPLT is "1" is received, and thus the latch circuit (LT) 405A outputs a pulse P2 to the signal line 105. With this operation, the data from MPD0 to MPD3 are output to a signal line 106 in parallel from the latch circuit (LT) 604. As described above, on the basis of the data (MPDx) transferred in four transfer sequences, the decoder circuit 605 outputs a selection signal.

Explanations of Apparatuses

Figure 12:
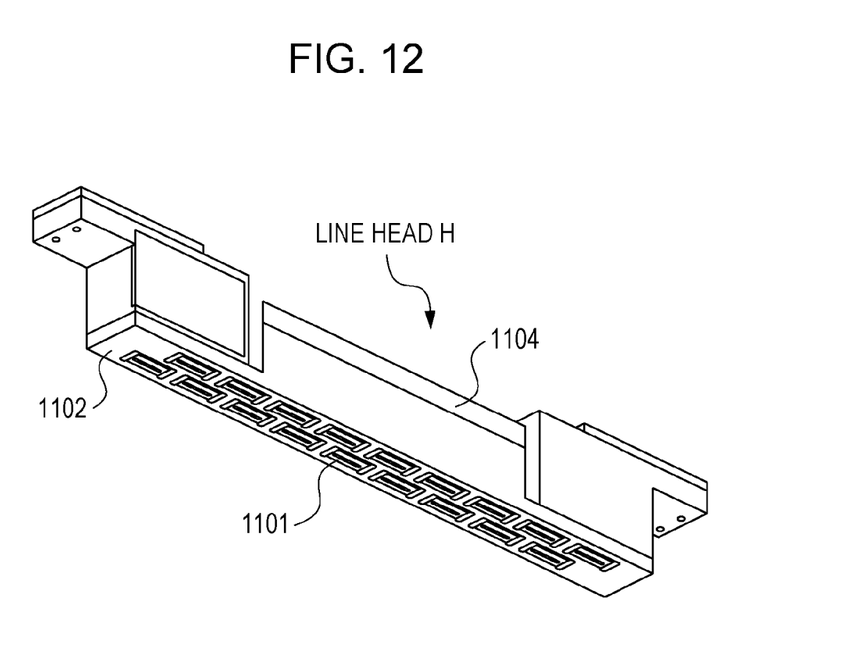
FIG. 12 is a diagram illustrating the appearance of a device in which an embodiment is applied.

The embodiments applied in the data transfer in a serial format were explained above. FIG. 12 is a diagram illustrating a line head (recording head) H as an example of the apparatus 10 described above. Multiple recording element substrates 1101 are arranged on the line head H. The numeral 1102 indicates a head substrate which is a wiring substrate having an electrical wiring structure such as that of a flexible printed circuit (FPC), a printed circuit board (PCB) or ceramic wiring. The recording element substrates 1101 are electrically connected to the head substrate 1102 by wire bonding or the like. For example, the circuits shown in FIG. 1 are arranged on the recording element substrates 1101. A connection electrode 1104 includes terminals by which the data signal (DATA), the trigger signal (Lat) and the clock signal (CLK) shown in FIG. 1 are input.

The apparatus 20 includes a conveying unit that conveys a recording medium. The apparatus 20 is a recording device including a feeding unit that feeds the recording medium to the conveying unit, a discharging unit that discharges the recording medium on which recording has been performed, and the like.

Other Embodiments

While the data transfer in a serial format has been described, the driving elements described above are not limited to a recording element but may be a light emitting device that is used in a display device, a line sensor that is applied in a reading device, a DC motor, a stepping motor, or the like. Therefore, the driving circuit is not limited to a circuit that drives a recording element but may be a circuit that drives a light emitting device that is used in a display device, a line sensor that is applied in a reading device, a DC motor, a stepping motor, or the like. Meanwhile, the HE signal shown in FIG. 5 is used to determine the period in which the recording element is driven, but may be applied to the control of the period in which the light emitting device is driven or the control of the period in which a coil of the motor is excited. In addition, the HE signal shown in FIG. 5 is composed of a prepulse and a main pulse, but may be composed of three or more pulses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A recording element substrate for performing recording, the recording element substrate comprising:

a first shift register to which a data signal including first information consisting of multiple bits and second information consisting of a smaller number of bits than a number of the multiple bits is input based on a clock signal;

a first latch circuit configured to latch the first information based on a trigger signal;

a second shift register to which the second information inputted to the first shift register is input based on a pulse signal; and a second latch circuit configured to latch the second information inputted to the second shift register, wherein the data signal is received from the first shift register upon input of the trigger signal.

2. The recording element substrate according to claim 1, further comprising:

a driving circuit connected to the first latch circuit and the second latch circuit.

3. A recording head comprising:

a first shift register to which a data signal including first information consisting of multiple bits and second information consisting of a smaller number of bits than a number of the multiple bits is input based on a clock signal;

a first latch circuit configured to latch the first information based on a trigger signal;

a second shift register to which the second information inputted to the first shift register is input based on a pulse signal;

a wiring substrate including a wiring connected to a recording element substrate; and a second latch circuit configured to latch the second information inputted to the second shift register, wherein the data signal is received from the first shift register upon input of the trigger signal.

4. The recording head according to claim 3, further comprising:

a plurality of recording element substrate.

5. The recording head according to claim 3, further comprising:

a driving circuit connected to the first latch circuit and the second latch circuit.

* * * * *